May 9, 1950     A. O. ROBERTS     2,507,050

PLANETARY TRANSMISSION UNIT

Filed Feb. 7, 1946     2 Sheets-Sheet 1

ALBERT O. ROBERTS
INVENTOR

E. C. McRae
R. D. Harris
J. R. Faulkner
T. H. Oster
ATTORNEYS.

May 9, 1950     A. O. ROBERTS     2,507,050
PLANETARY TRANSMISSION UNIT

Filed Feb. 7, 1946     2 Sheets-Sheet 2

ALBERT O. ROBERTS
INVENTOR

BY
ATTORNEYS.

Patented May 9, 1950

2,507,050

UNITED STATES PATENT OFFICE 2,507,050

PLANETARY TRANSMISSION UNIT

Albert O. Roberts, Dearborn, Mich., assignor to Ford Motor Company, Dearborn, Mich., a corporation of Delaware Application February 7, 1946, Serial No. 646,097

4 Claims. (Cl. 74—781)

This invention relates generally to transmissions, and more particularly to transmission units of the planetary type.

An object of the present invention is to provide a transmission adapted to transmit power at a pair of different speed ratios, and having means for smoothly effecting a transition from one speed ratio to the other.

A further object of the invention is to provide a planetary transmission adapted to transmit power at a pair of different speed ratios, and provided with a clutch and brake unit for effecting the power transmission in these two speed ratios respectively. During normal operation one clutch automatically remains engaged to lock two of the elements of the planetary gearset together to transmit power at a unitary ratio. The application of the brake is effective to lock one of the elements of the planetary gearset to the housing, and simultaneously to release the first-mentioned clutch, to enable power to be transmitted through the gearset at a predetermined speed ratio.

Still another object of the invention is to provide a planetary unit adapted to selectively transmit power at one of a pair of different speed ratios, and which may be readily coupled to one or more similar planetary gearsets to provide a transmission unit capable of transmitting power at a plurality of different speed ratios.

Other objects and advantages of the invention will be made more apparent as this description proceeds, particularly when considered in connection with the accompanying drawings, in which.

Figure 1:
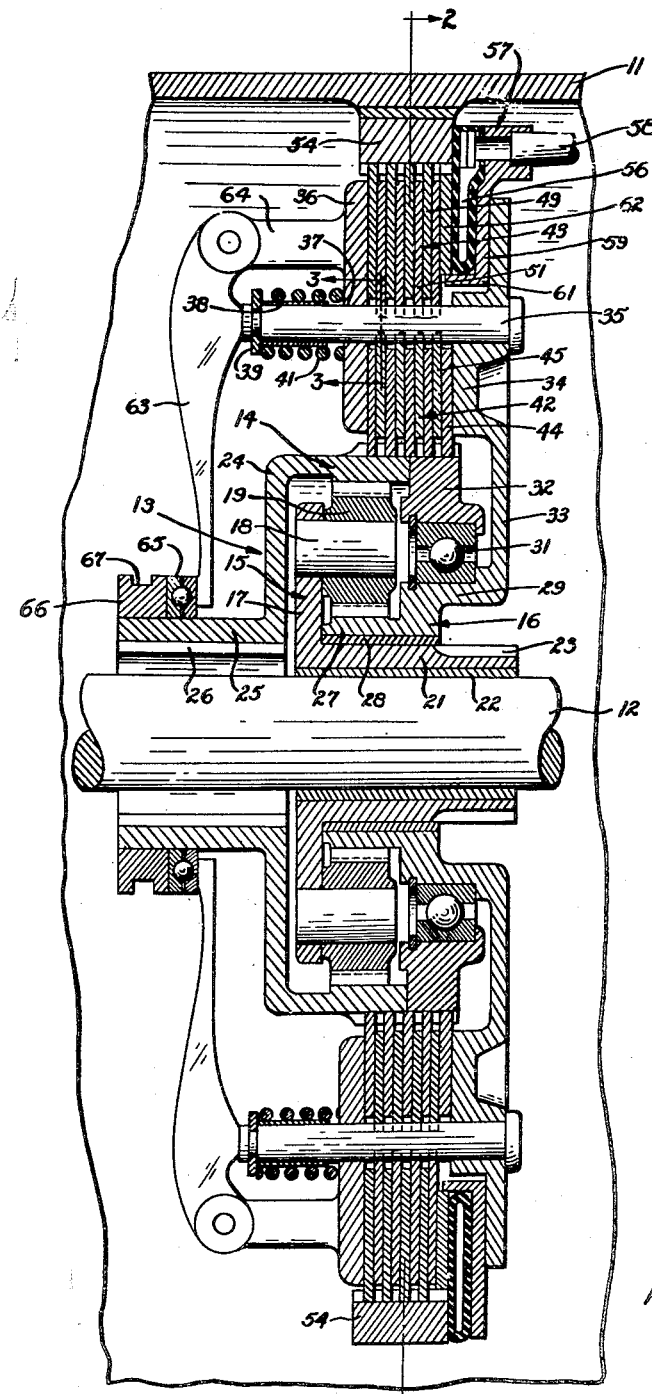
Figure 1 is a longitudinal cross-sectional view through a transmission unit embodying the present invention.
Figure 2:
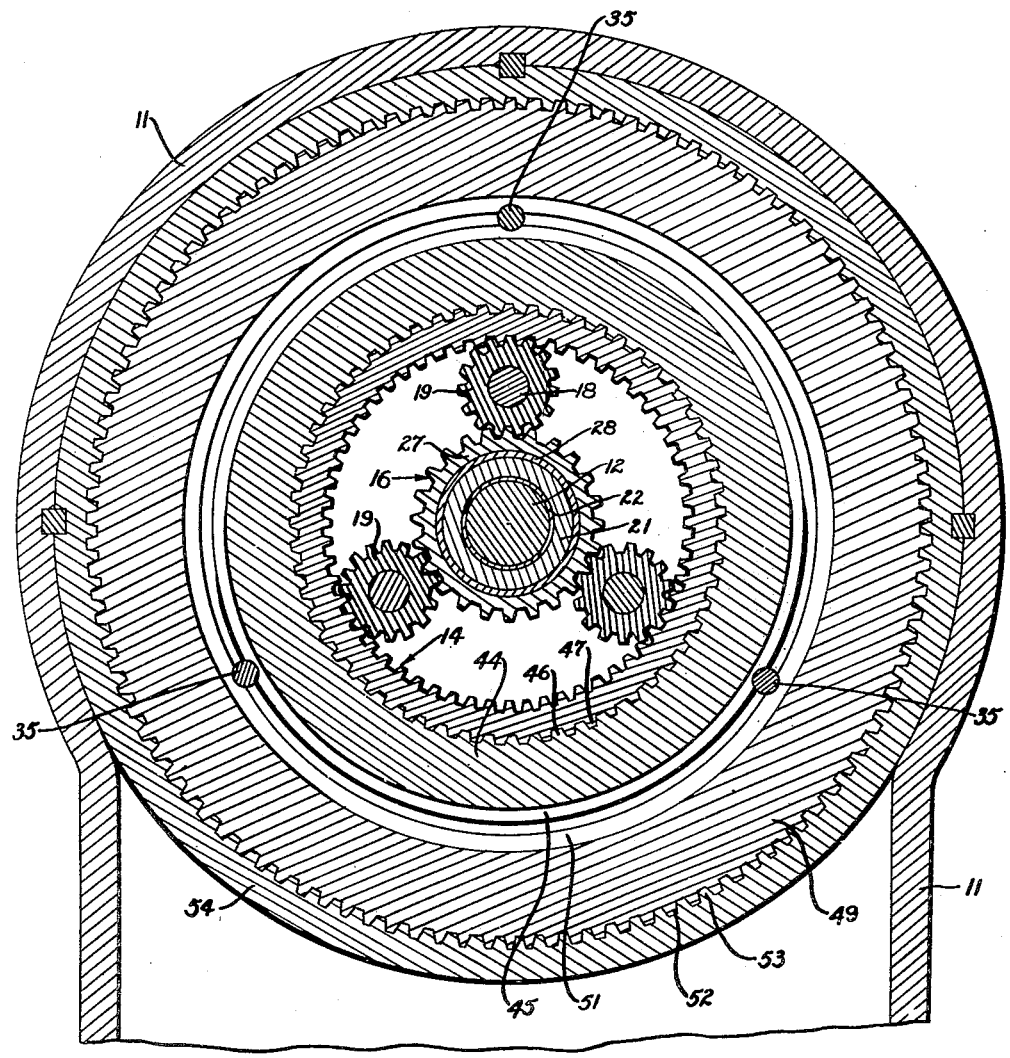
Figure 2 is a slightly reduced transverse cross-sectional view taken substantially on the plane indicated by the line 2—2 of Figure 1.
Figure 3:
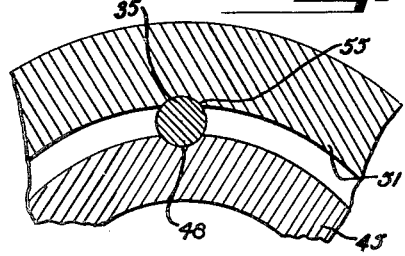
Figure 3 is a fragmentary cross-sectional view taken substantially on the plane indicated by the line 3—3 of Figure 1.

The transmission unit of the present invention may be used as a two speed transmission for any desired purpose, or it may be embodied as a unit into a larger transmission mechanism, such as a multispeed transmission for a motor vehicle. It is particularly adaptable for use in a transmission of the automatic type.

Referring now more particularly to the drawings, the transmission unit is contained within the housing 11 and arranged concentrically about the shaft 12, the latter being suitably journaled in the housing. The planetary gearset 13 of the unit comprises a ring gear 14, a planet carrier 15 and a sun gear 16. The planet carrier 15 has a spider 17 carrying a plurality of stub shafts 18 rotatably supporting planet pinions 19. At the radially inner edge of the spider 17, the planet carrier is formed with a hub 21 journaled on the shaft 12 by means of a bearing 22. The outer end of the hub 21 of the planet carrier is formed with external splines 23 for coupling to an input or output member (not shown).

The ring gear 14 is provided with internal gear teeth meshing with the planet pinions 19 and is integrally connected by a web 24 to a hub 25 provided with internal splines 26 for coupling to a suitable input or output member (not shown). Sun gear 16 has a hub 27 formed on its periphery with teeth meshing with the planet pinions 19, and is journaled on the hub 21 of the planet carrier by means of a bearing 28. The hub 27 of the sun gear is stepped to form a shoulder 29 upon which is mounted a ball bearing 31. Secured to the ring gear 14 is a supporting ring 32 which is rotatably mounted upon the ball bearing 31. The ring gear is thus mounted for rotation about the axis of the shaft 12.

The sun gear 16 is formed with an integral flange 33 extending radially outwardly a substantial distance beyond the periphery of the ring gear 14. A plurality of axially extending studs 35 are rigidly mounted in an annular boss 34 formed on the sun gear flange 33. The studs are angularly spaced around the flange, and in the present instance three are used, being pressed into the boss 34. A pressure plate 36, in the form of a ring, is provided with apertures 37 in alignment with the studs 35 to enable the plate to be slidably mounted thereon. Sleeves 38 are carried on the free ends of the studs 35, being held thereon by split retaining rings 39, and function to limit outward movement of the pressure plate 36. A compression coil spring 41 encircles each sleeve 38 and extends between the retaining rings 39 and the pressure plate 36 to resiliently urge the plate toward the flange 33 of the sun gear.

A friction clutch 42 and a brake 43 are mounted between the pressure plate 36 and the sun gear flange 33. The function of the direct speed clutch 42 is to couple the ring and sun gears 14 and 16 together, locking the latter against relative rotation and causing the planetary gearset 13 to rotate as a unit and to transmit power at a unitary speed ratio. The function of the geared speed brake 43 is to couple the sun gear 16 to the housing 11, locking the sun gear against rotation and providing a reaction member enabling power to be transmitted through the planetary gearset at a predetermined speed ratio.

The direct speed clutch 42 comprises a plurality of interleaved annular friction discs 44 and 45. The friction discs 44 are provided with internal teeth 46 meshing with a series of external teeth 47 formed on the periphery of the ring gear 14 and the supporting ring 32. It will be apparent that the friction discs 44 are thus non-rotatably mounted on the ring gear but are free to move axially thereon. The friction discs 45 are provided on their periphery with notches 48 fitting the studs 35, and are thus non-rotatably and slidably mounted on the studs.

During normal operation, the pressure plate 36 is urged by the coil springs 41 toward the sun gear flange 33, clamping the friction discs 44 and 45 between the pressure plate and the boss 35 on the flange. The frictional engagement of the friction discs with each other locks the ring gear 14 to the flange 33, and since the latter is integrally formed on the sun gear 16, the ring and sun gears are locked together. With the clutch 42 engaged, therefore, the planetary gearset 13 functions as a unit and transmits power between the hubs 21 and 25 at a unitary ratio. A direct drive at a 1-1 ratio is provided, regardless of whether the hub 25 is used as the input and the hub 21 as the output, or vice versa.

The geared speed brake 43 comprises a plurality of interleaved annular fritcion discs 49 and 51. The friction discs 49 are provided on their periphery with teeth 52 meshing with internal teeth 53 formed upon a stationary ring 54 keyed to the housing 11. The friction discs 49 are thus non-rotatably mounted upon the transmission housing, but are free to move axially therein. The friction discs 51 are formed at their inner edges with notches 55 engaging the studs 35, and are thus non-rotatably and slideably mounted on the studs.

Although various means may be provided for applying the geared speed brake 43, a fluid pressure actuator is particularly adapted for this purpose and is shown in the drawings. The fluid pressure actuator comprises an expansible chamber or Sylphon 56 mounted upon an annular stationary supporting member 57 carried by the housing. Fluid pressure is introduced into the Sylphon through a conduit 58. The supporting member 57 is formed with a web 59 engaging the outer portion of the radical flange 33 of the sun gear and with an axially extending hub 61. The hub 61 prevents radial expansion of the Sylphon 56 and in addition guides the ring 62 in an axial direction.

The introduction of fluid pressure to the Sylphon 56 through the conduit 58 can be controlled by any suitable means, either manually or automatically, as is well known in the art.

It will be apparent from the foregoing that when fluid pressure is admitted to the Sylphon chamber 56, the expansion thereof forces the ring 62 and the friction discs 49 and 51 toward the pressure plate 36. Axial movement of the pressure plate 36 is limited by engagement of the pressure plate 36 with the sleeve 38. The resulting frictional engagement between friction discs 49 and 51 is effective to lock the sun gear 16 to the housing through the stationary ring 54 and the studs 35 carried by the sun gear flange 33.

Simultaneously with the engagement of the geared speed brake 43 by the application of fluid pressure to the Sylphon 56, the direct speed clutch 42 is disengaged. This is effected by reason of the fact that the pressure plate 36 is moved axially outwardly against the action of the compression coil spring 41, releasing the friction discs 44 and 45 of the direct speed clutch from frictional engagement with each other.

The simultaneous application of the geared speed brake 43 and release of the direct speed clutch 42 results in freeing the ring and sun gears from locking engagement with each other and simultaneously anchoring the sun gear to the housing. The sun gear thus forms a reaction member, and when the hub 25 of the ring gear is used as the input, power is transmitted from the ring gear 14 through the planet pinions 19 to the planet carrier 15 at a predetermined speed reduction. Since the geared speed brake 43 is progressively engaged simultaneously with the progressive disengagement of the direct speed clutch 42, the transition between direct drive and the geared speed drive is effected smoothly.

Means are provided for simultaneously disengaging both the direct speed clutch 42 and the geared speed brake 43 to place the transmission in neutral. Actuating levers 63 are pivotally mounted upon brackets 64 projecting rearwardly from the pressure plate 36 and are adapted to engage the outer ends of the studs 35 at intermediate points on the levers. The radially inner ends of the levers 63 are engaged by a bearing 65 and a sleeve 66, the latter being provided with a peripheral groove 67 for actuation by a suitable fork (not shown). When the sleeve 66 is moved to the right as seen in Figure 1, the studs 35 form fulcrums for the levers 63 and the latter function to pull the pressure plate 36 outwardly against the action of the coil spring 41. This releases both clutch 42 and brake 43, and places the transmission in neutral.

If desired, the transmission unit described above can be used as an overdrive by utilizing the hub 21 of the planet carrier as the input and the hub 25 of the ring gear as the output. With this arrangement, power is transmitted at a unitary ratio under normal conditions until the geared speed brake 43 is applied by means of the fluid pressure Sylphon 56. The resulting release of clutch 42, and the locking of the sun gear to the housing, permits power to be transmitted from the planet carrier 15 through the planet pinions 19 to the ring gear 14 at a predetermined speed increase. The present invention is thus adapted, without change of construction except reversing the input and output, to be used either as a speed reduction unit or as an overdrive unit.

In addition, two or more transmission units of the type described can be coupled in series to provide a multispeed transmission. This can be accomplished simply by mounting the units in series upon the shaft 12 with the splines 23 on the hub 21 of the planet carrier of one unit in engagement with the splines 26 on the hub 25 of the ring gear of the adjacent unit. Combining the units in this manner not only provides a compact transmission having a plurality of speed ratios readily available, but simplifies manufacture by the duplication of parts. In a transmission of this type only one of the units would be provided with a neutral lever 63.

It will be understood that the invention is not to be limited to the exact construction shown and described, but that various changes and modifications may be made without departing from the spirit and scope of the invention, as defined in the appended claims.

What is claimed is:

1. A variable speed power transmission comprising a housing, a planetary gearset having a ring gear, a planet carrier supporting planet pinions meshing with said ring gear, and a sun gear meshing with said planet pinions, a first series of annular friction discs encircling said ring gear and mounted thereon, a member carried by said sun gear, a second series of annular friction discs mounted upon said member and engageable with said first-mentioned friction discs, a pressure plate, spring means acting upon said pressure plate and normally holding said first and second friction discs in frictional engagement with each other to lock said ring and sun gears together and transmit power at a unitary ratio, a third series of annular friction discs of larger diameter encircling said member and mounted thereon, a fourth series of annular friction discs mounted upon said housing and engageable with said third series of friction discs, said third and fourth series of friction discs, encircling said first and second series of friction discs, an expansible fluid pressure chamber adjacent said third and fourth series of friction discs, and means for supplying fluid pressure to said chamber to move said last two mentioned series of friction discs into frictional engagement with each other to lock said sun gear to said housing to transmit power through said planetary gearset at a predetermined speed ratio.

2. A variable speed power transmission comprising a housing, a planetary gearset having a ring gear, a planet carrier supporting planet pinions meshing with said ring gear, and a sun gear meshing with said planet pinions and having a radially extending flange carried thereby, a plurality of axially extending supports carried by said flange and spaced radially outwardly from said ring gear, a series of friction discs between said ring gear and said supports and slideably and non-rotatably mounted upon said ring gear, a second series of friction discs adjacent said first series and slideably and non-rotatably mounted upon said supports, a third series of friction discs between said supports and said housing and slideably and non-rotatably mounted on said housing, a fourth series of friction discs adjacent said third series and slideably and non-rotatably mounted upon said supports, a pressure plate slideably mounted upon said supports, compression springs on said supports normally clamping said first and second series of friction discs between said pressure plate and said flange and in frictional engagement with each other to lock said ring and sun gears together, and fluid pressure means mounted upon said housing and adapted to force said third and fourth series of friction discs against said pressure plate and in frictional engagement with each other to anchor said flange and sun gear to said housing.

3. The structure defined by claim 2 which is further characterized in that actuating means are provided for moving said pressure plate against the action of said compression spring to release all of said friction discs from frictional engagement with each other.

4. A variable speed power transmission comprising a housing, a planetary gearset having a ring gear, a planet carrier supporting planet pinions meshing with said ring gear, and a sun gear meshing with said planet pinions, a radially extending supporting flange carried by said sun gear, a support extending axially from said flange and spaced radially outwardly from said ring gear, a spring urged pressure plate slideably mounted upon said axial support, co-operating friction members mounted respectively upon said ring gear and said axial support and located between said flange and said pressure plate, additional co-operating friction members encircling said first-mentioned friction members and said axial support and mounted respectively upon said axial support and said housing and also located between said pressure plate and said flange, fluid pressure means between said pressure plate and said flange, means for applying fluid pressure to said means to clamp said second-mentioned friction members together to lock said sun gears to said housing, a lever pivotally mounted upon said pressure plate and having a fulcrum engageable with said axially extending support, and actuating means engageable with the radially inner end of said lever to move said pressure plate on said axially extending support against the action of said spring to release and disengage said first and second mentioned co-operating friction members.

ALBERT O. ROBERTS.

REFERENCES CITED

The following references are of record in the file of this patent:

UNITED STATES PATENTS

| Number | Name | Date |
|---|---|---|
| 1,837,908 | Kamper | Dec. 22, 1931 |
| 2,115,964 | Osborne | May 3, 1938 |
| 2,136,971 | Fleischel | Nov. 15, 1938 |
| 2,348,424 | Shorter | May 9, 1944 |

FOREIGN PATENTS

| Number | Country | Date |
|---|---|---|
| 565,867 | France | Feb. 5, 1924 |
| 875,966 | France | Oct. 9, 1942 |